(12) United States Patent
Hofmann et al.

(10) Patent No.: US 8,077,019 B2
(45) Date of Patent: Dec. 13, 2011

(54) METHOD OF ASSOCIATING GROUPS OF CLASSIFIED SOURCE ADDRESSES WITH VIBRATION PATTERNS

(75) Inventors: Richard Gerard Hofmann, Cary, NC (US); Gerald Paul Michalak, Cary, NC (US); Barry Joe Wolford, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 11/553,600

(22) Filed: Oct. 27, 2006

(65) Prior Publication Data

US 2007/0176742 A1    Aug. 2, 2007

Related U.S. Application Data

(60) Provisional application No. 60/760,111, filed on Jan. 19, 2006.

(51) Int. Cl.
*H04B 3/36* (2006.01)

(52) U.S. Cl. ............... 340/407.1; 340/7.46; 340/7.47; 340/7.58; 340/7.59; 340/7.6; 455/427; 455/567

(58) Field of Classification Search ............ 340/407.1, 340/7.59; 455/427
See application file for complete search history.

(56) References Cited

U.S. PATENT DOCUMENTS

| | | | | |
|---|---|---|---|---|
| 4,959,648 A * | 9/1990 | Breeden et al. | ............. | 340/7.3 |
| 5,394,140 A * | 2/1995 | Wong et al. | ............. | 340/7.39 |
| 5,504,476 A * | 4/1996 | Marrs et al. | ............. | 340/7.48 |
| 5,604,491 A * | 2/1997 | Coonley et al. | ............. | 340/7.59 |
| 6,118,979 A * | 9/2000 | Powell | ............. | 340/7.6 |
| 6,160,489 A * | 12/2000 | Perry et al. | ............. | 340/7.6 |
| 6,385,461 B1 * | 5/2002 | Raith | ............. | 455/518 |
| 6,477,370 B1 * | 11/2002 | Sigler et al. | ............. | 455/427 |
| 6,542,750 B2 * | 4/2003 | Hendrey et al. | ............. | 455/456.1 |
| 6,653,930 B1 * | 11/2003 | Bonomo et al. | ............. | 340/7.59 |
| 6,850,150 B1 | 2/2005 | Ronkainen | | |

(Continued)

FOREIGN PATENT DOCUMENTS

DE    10161133    7/2003

(Continued)

OTHER PUBLICATIONS

International Search Report and Written Opinion—PCT/US2007/060805, International Search Authority—European Patent Office—Jul. 10, 2007.

*Primary Examiner* — Hung T. Nguyen
(74) *Attorney, Agent, or Firm* — Joseph B. Agusta; James T. Hagler

(57) ABSTRACT

In a meeting or group event, people having a portable device, such as a cell phone or pager, may wish to be discretely notified when an important message is received, an urgent call comes in from a selected person or a selected group of people, or to be alerted to an upcoming important event without any audible alert to disturb the meeting or group event. To convey such a notification, a tactile alert is provided by vibrating the portable device according to a unique vibration pattern associated with the received communication. When a communication is received, a group identification (ID) is assigned based on the communication being a member of a classified group of source addresses. The portable device associates the group ID with a unique vibration pattern. To provide the alert, the portable device is vibrated according to the unique vibration pattern.

20 Claims, 6 Drawing Sheets

U.S. PATENT DOCUMENTS

| | | | |
|---|---|---|---|
| 7,206,841 B2 * | 4/2007 | Traversat et al. | 709/225 |
| 7,418,258 B2 * | 8/2008 | Moody et al. | 455/414.1 |
| 7,609,669 B2 * | 10/2009 | Sweeney et al. | 370/328 |
| 2004/0066932 A1 | 4/2004 | Seligmann | |
| 2005/0238325 A1 * | 10/2005 | Tanabe et al. | 386/95 |
| 2005/0272455 A1 * | 12/2005 | Oommen | 455/518 |
| 2006/0073821 A1 * | 4/2006 | Rantapuska | 455/423 |
| 2006/0248183 A1 * | 11/2006 | Barton | 709/224 |
| 2007/0066232 A1 * | 3/2007 | Black | 455/67.11 |
| 2007/0176742 A1 * | 8/2007 | Hofmann et al. | 340/7.6 |
| 2008/0153554 A1 * | 6/2008 | Yoon et al. | 455/567 |
| 2010/0001849 A1 * | 1/2010 | Lee et al. | 340/407.2 |
| 2010/0004028 A1 * | 1/2010 | Park et al. | 455/566 |
| 2011/0169622 A1 * | 7/2011 | Billmaier et al. | 340/407.1 |

FOREIGN PATENT DOCUMENTS

| | | | |
|---|---|---|---|
| EP | 1612749 | | 1/2006 |
| JP | 1997037322 | | 2/1997 |
| JP | 2000042491 | | 2/2000 |
| JP | 2000134670 | | 5/2000 |
| JP | 2000134670 A | * | 5/2000 |
| JP | 2000196709 | | 7/2000 |
| JP | 2001217903 | | 8/2001 |
| JP | 2005236429 | | 9/2005 |
| KR | 2004-0087566 | * | 10/2004 |
| KR | 20040087566 | | 10/2004 |

* cited by examiner

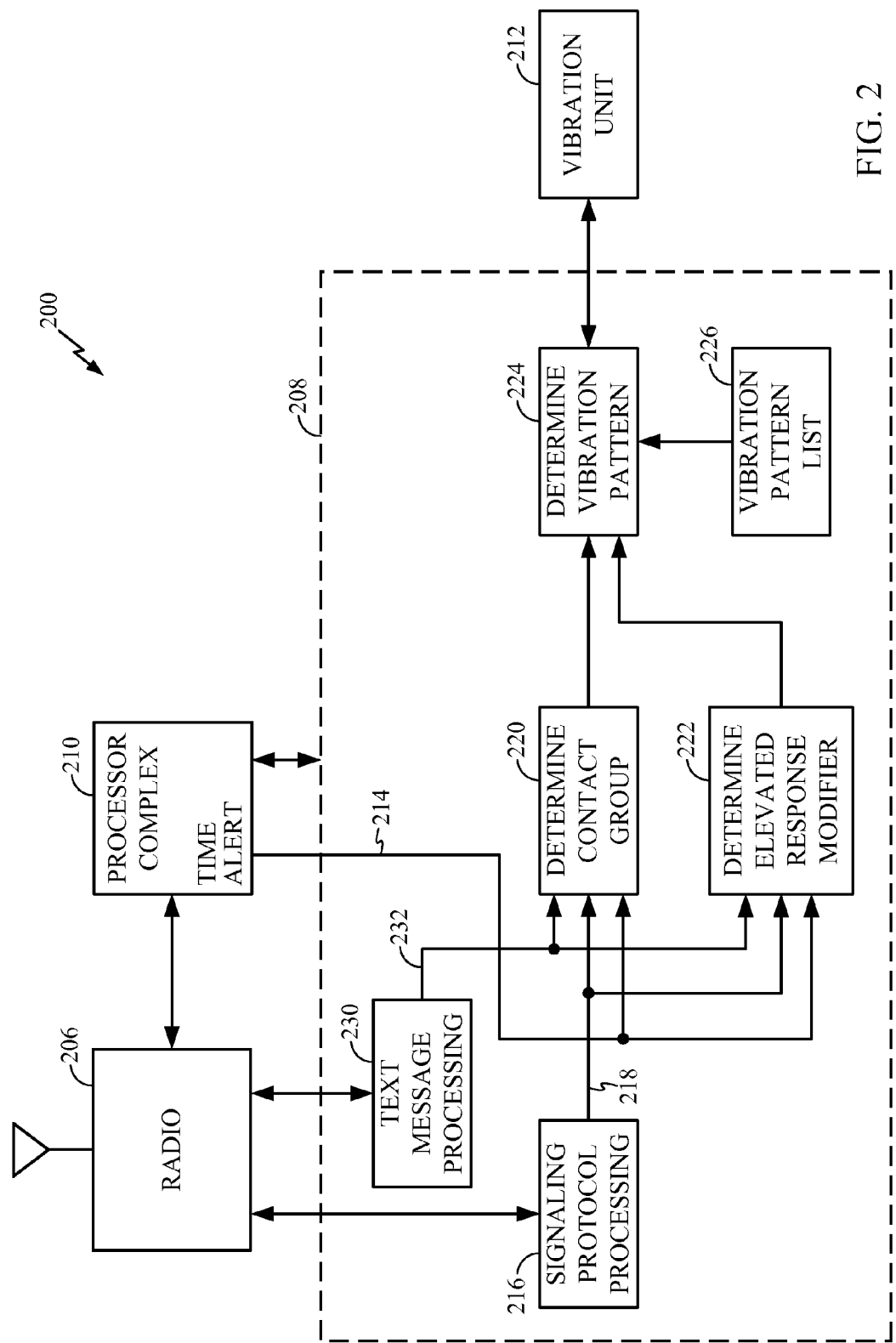

METHOD OF ASSOCIATING GROUPS OF CLASSIFIED SOURCE ADDRESSES WITH VIBRATION PATTERNS

CLAIM OF PRIORITY UNDER 35 U.S.C. §119

The present Application for Patent claims priority to Provisional Application No. 60/760,111 entitled "Methods and Apparatus for Associating Vibration Patterns with Ringtone Groups" filed Jan. 19, 2006, and assigned to the assignee hereof and hereby expressly incorporated by reference herein.

FIELD OF INVENTION

The present invention relates generally to mobile communication devices, and more particularly, to techniques for conveying information to a user of a mobile communication device by tactile means.

BACKGROUND OF INVENTION

An incoming message or call to a mobile communication device, such as a cell phone, pager, personal data assistant (PDA), portable inventory tool, notebook computer, or the like, may trigger an audible alert, such as a ringing sound for any of a wide variety of ringtones, or the like. The ringing sound or ringtone, originally used in cable attached telephones, was commonly of a single frequency and duration. On mobile phones, ringtones can be customized to differentiate the ring of one ringing phone from the different rings of multiple phones and to personalize the ringtone to a user's preference.

Mobile devices may also allow a user to associate specific ringtones with specific entries in a personalized phonebook stored on the mobile device. The ringtones may be stored as music or as other audible sounds, such as the sound of a waterfall, traditional ringing sounds, special effect sounds, and the like. The flexibility to select ringtones and the capacity to store multiple ringtones has fostered the use of popular music segments as ringtones, which has reached commercial success by companies providing downloadable music ringtones at a price.

Many mobile phones also support a vibrating alert which may be used in conjunction with a ringtone to alert a user to an incoming call or text message. The vibrating alert may also be turned off or used without an accompanying ringtone. The vibrating alert feature is useful in noisy environments where a ringtone may not be clearly audible, in locations where a ringtone might be disturbing to an event underway, such as in a church or at a movie or play, to alert a user engaged in a conference, and for use by people with hearing impairments. In order to provide a vibration level of sufficient intensity to be recognized, even while the portable device is not visible, many mobile devices engage an embedded motor with an eccentric weight to cause the vibration.

Due to the proliferation of portable devices today and their increased usage, ringtones can become irritating to deal with in a wide variety of contexts, such as, business or family gatherings, by way of example.

SUMMARY

Among its several aspects, the present disclosure recognizes that with the advent of low cost portable devices, a majority of people in a meeting or group event will likely possess a portable device, such as a cell phone or pager, and may further wish to be discretely notified when an important message is received, an urgent call comes in from a selected person or a selected group of people, or to be alerted to an upcoming important event. An embodiment of the invention is a method for conveying a tactile alert on a portable device. When a communication is received, a group identification (ID) is assigned based on the communication being a member of a classified group of source addresses. The portable device associates the group ID with a unique vibration pattern. To provide the alert, the portable device is vibrated according to the unique vibration pattern.

Another embodiment of the invention addresses an apparatus for conveying a tactile alert on a portable device. A receiver is used for receiving an incoming communication. A processor complex having a processor and program memory executes alert processing tasks. An alert processing component having one or more alert processing tasks classifies the incoming communication and determines a unique vibration pattern for the classified incoming communication. A vibration unit vibrates the portable device according to the unique vibration pattern to convey the tactile alert.

Another embodiment according to another aspect of the present invention addresses a computer readable medium storing computer executable instructions which operate to convey a tactile alert on a portable device. The computer executable instructions are executed to assign a group identification (ID) for a communication received from a classified source address or time alert and to associate the group ID with a unique vibration pattern. The portable device vibrates according to the unique vibration pattern to convey the tactile alert.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the present invention. Accordingly, the drawings and detailed description are to be regarded as illustrative in nature and not as restrictive.

BRIEF DESCRIPTION OF DRAWINGS

FIG. 2 is a block diagram of a wireless device vibration controller;

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
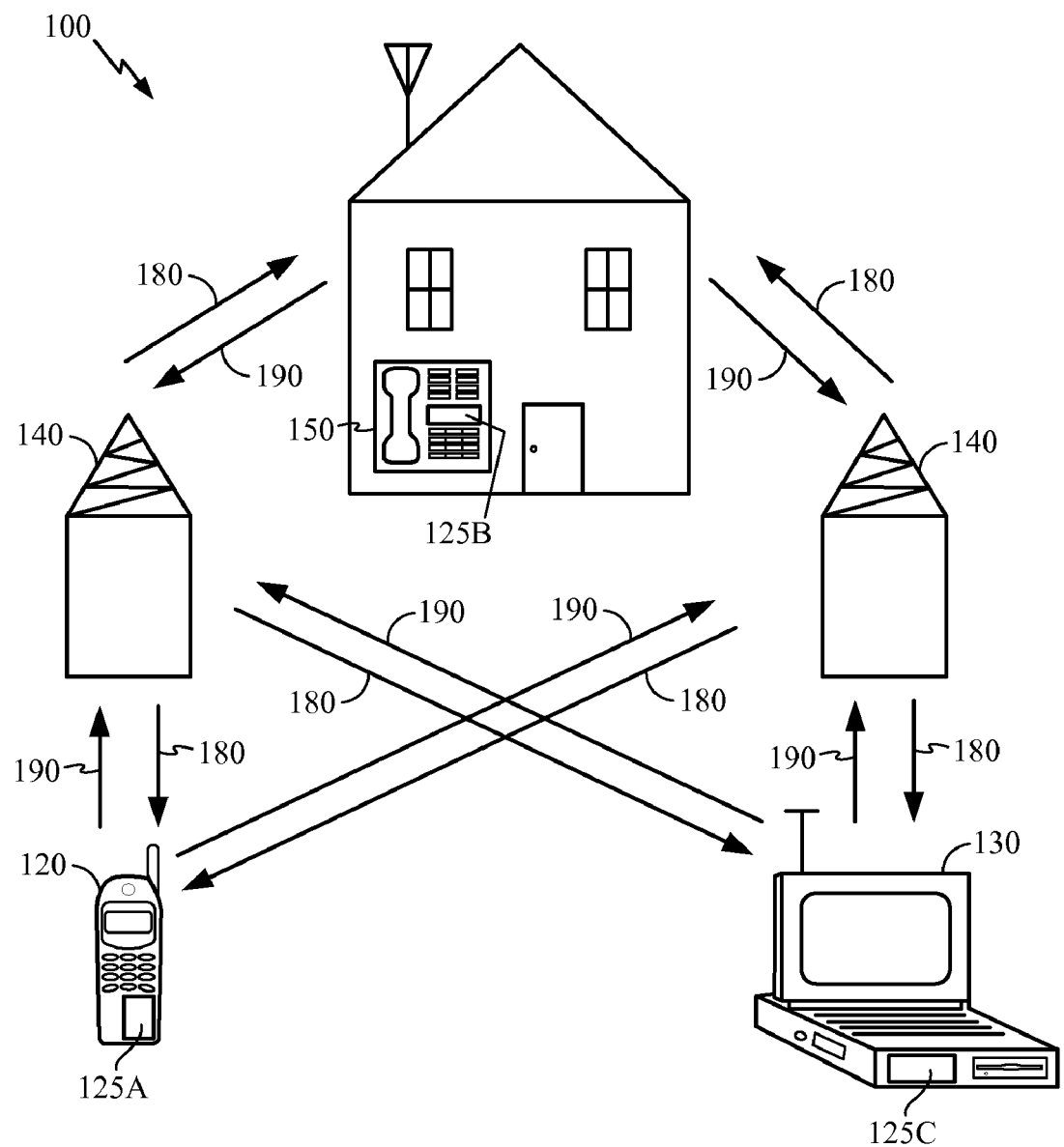
FIG. 1 illustrates a wireless communication system.

FIG. 1 shows an exemplary wireless communication system 100 in which an embodiment of the invention may be advantageously employed. For purposes of illustration, FIG. 1 shows three remote units 120, 130, and 150 and two base stations 140. It will be recognized that typical wireless communication systems may have many more remote units and base stations. Remote units 120, 130, and 150 include hardware components, software components, or both as represented by components 125A, 125C, and 125B, respectively, which have been adapted to embody the invention as discussed further below. FIG. 1 shows forward link signals 180 from the base stations 140 to the remote units 120, 130, and 150 and reverse link signals 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. For example, the remote units may be cell phones, pagers, walkie talkies, handheld personal communication systems (PCS) units, portable data units such as personal data assistants, or fixed location data units such as meter reading equipment. Although FIG. 1 illustrates remote units according to the teachings of the invention, the invention is not limited to these exemplary illustrated units. The invention may be suitably employed in any device having a controllable vibration unit to alert a user of an incoming call, receipt of data, or the like.

FIG. 2 is a block diagram of a wireless device vibration controller 200 in accordance with an embodiment of the invention. The wireless device vibration controller 200 may advantageously be used within or as part of a wide variety of components, such as components 125A, 125B, and 125C of FIG. 1. The wireless device vibration controller 200 comprises a radio 206, an alert processing component 208, a processor complex 210, and a vibration unit 212. The radio 206 receives and transmits information over various radio frequencies and communicates the information with the alert processing component 208. The alert processing component 208 operates under control of the processor complex 210 to process the information communicated with the radio 206 and control the vibration unit 212. For example, the alert processing component 208 may consist of a programmable hardware state machine or may advantageously consist of software tasks allowing flexibility and programmability of unique functions. The processor complex 210 may consist of a single or multiple processors, with program memory, data memory, and peripheral interfaces as required by the mobile device. The processor complex 210 also supports additional functions and features as required for the mobile device, such as, generation of a time alert identification (ID) 214, which may be used to alert a user of an upcoming event, such as, a meeting or an appointment. The vibration unit 212 may suitably comprise electronic drive circuitry and a device to produce vibrations, such as a motor with an eccentric weight, a piezo electric device, or a specialized vibrator having selectable control over a wide range of vibration patterns, for example.

The alert processing component 208 in one embodiment of the invention is organized as a set of tasks which operate to control the vibration unit 212. After set up configuration, the alert processing component 208 operates, for example, upon receipt of an incoming call received from the radio 206. When the radio 206 detects an incoming call, the signaling protocol processing task 216 is notified and a calling phone number 218 is determined. The calling phone number 218 is communicated to a determine contact group task 220 which determines if the calling phone number 218 is part of a previously set up group of phone numbers or represents a phone number not assigned to any group. If the calling phone number 218 is determined to be a part of a previously set up group of phone numbers, an indication of the determined calling group is sent to a determine vibration pattern task 224.

The calling phone number 218 is also communicated to a determine elevated response modifier task 222 which determines whether an elevated response modifier is associated with the calling phone number. For example, if the call is a second call from the same calling phone number and received within a specified time period, then such an event could be evaluated as requiring an elevated response. An elevated response modifier is then sent to a determine vibration pattern task 224. The determine vibration pattern task 224 selects a vibration pattern from a vibration pattern list 226, may generate a vibration pattern, and may modify a vibration pattern based on the calling group and an elevated response modifier. The determined vibration pattern is sent to the vibration unit 212 to initiate the vibration. It is also noted that phone calls from phone numbers deemed to be non-critical may be set up with a no-vibration pattern. The no-vibration pattern ensures that the portable device provides no tactile alert for calls received from such phone numbers even if the vibration unit is enabled.

The alert processing component 208 in another embodiment of the invention is organized into a set of tasks to process alerts for incoming messages. After set up configuration, the alert processing component 208 operates upon receipt of an incoming message received from the radio 206. For example, when the radio 206 detects an incoming message, the text message processing task 230 is notified and a message source address 232 is determined. The message source address 232 is communicated to the determine contact group task 220 which determines if the message source address 232 is part of a previously set up group of message source addresses or represents a message source address not assigned to any group. If the message source address 232 is determined to be a part of a previously set up group, an indication of the determined message group is sent to a determine vibration pattern task 224. An elevated response modifier may also be associated with an incoming message in a similar manner to an incoming phone call to appropriately notify the user of an elevated response incoming message.

It is noted that a text message may be from an originating source address or forwarded from a different source address. The text message processing task 230 determines if a text message received from a forwarded address should be processed with a vibration pattern associated with the original source address of the text message or if the source address of the forwarding source be used. For example, if a text message is forwarded with an urgency indication, then the text message may be examined to determine the source address of the original message. The original message source address is then compared to existing groups. If an existing group is found, the vibration pattern for the existing group is used for the vibration pattern. If no existing group is found, a default urgency vibration pattern may be used. An elevated response modifier may also be associated with a forwarded message in a similar manner to an incoming phone call to appropriately notify the user of an elevated response incoming message.

The alert processing component 208 in another embodiment of the invention is organized into a set of tasks to process alerts for time based events. After set up configuration, the alert processing component 208 operates upon receipt of a time alert ID 214 received from the processor complex 210. For example, when the processor complex 210 detects a time out or a match with a scheduled event and a local time base, the alert processing component 208 is notified. The time alert ID 214 is communicated to the determine contact group task 220 which determines if the time alert ID 214 is part of a previously set up group of time alerts or represents a time alert not assigned to any group. If the time alert ID 214 is determined to be a part of a previously set up group, an indication of the determined time alert group is sent to a determine vibration pattern task 224. An elevated response modifier may also be associated with a time alert in a similar manner to an incoming phone call to appropriately notify the user of an elevated response time alert.

Phone numbers, text message source addresses, and time periods may be organized into groups, such as, emergency, business, family, unknown, 8 AM to 5 PM, after 10 PM and before 8 AM, or the like. A group may be a single phone number, a text message source address, or a specific time period. There may also be multiple groups assigned to a higher level classification of the groups, for example, multiple groups assigned to a business class, multiple groups assigned to a family class, and multiple time period groups assigned to a time based event class. These various classes may be individually controlled, for example, blocking all alerts due to phone calls from the business class while allowing alerts for phone calls from the family class. An emergency class may be initially configured to not be blocked as a default setting.

Figure 3A:
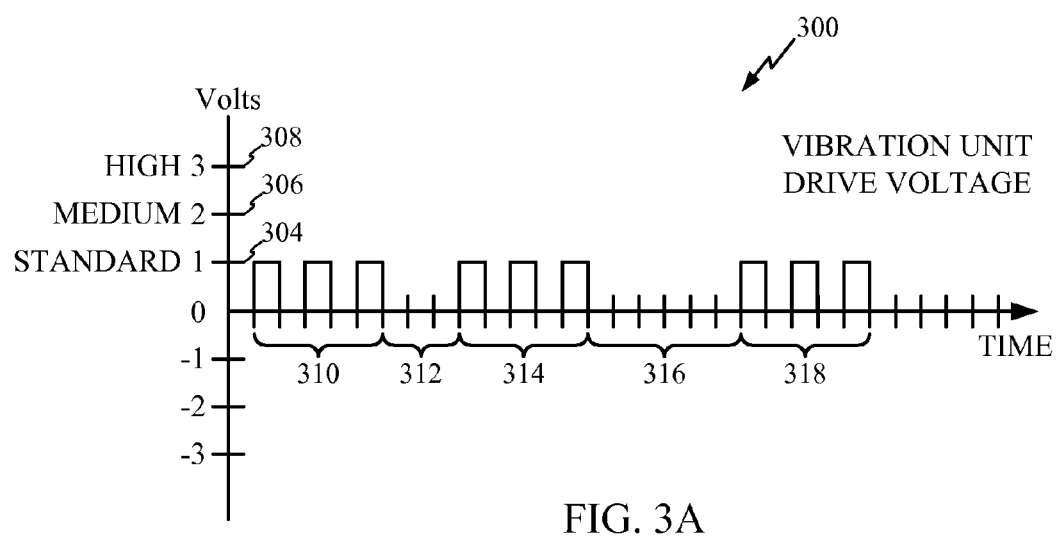
FIG. 3A illustrates a graph of a first drive voltage pattern for a vibration unit.

FIG. 3A illustrates a graph of a first drive voltage pattern 300 for a vibration unit in accordance with an embodiment of the invention. The drive voltages 304, 306, and 308, 1 volt, 2 volts, and 3 volts, respectively, correspond to a standard vibration, a medium vibration, and a high vibration, respectively. In FIG. 3A, the first drive voltage pattern 300 is shown as having periods of standard voltage pulses of fixed pulse duration and repetition rate with quiet gaps in between. The first drive voltage pattern consists of a first series of voltage pulses 310, quiet gap 312, second series voltage pulses 314, quiet gap 316, and a third series of voltage pulses 318. A vibration unit, such as vibration unit 212, responds to the voltage pulses by vibrating the portable device. The vibrations of unit 212 track the first drive voltage pattern 300 and convey information tactilely.

Figure 3B:
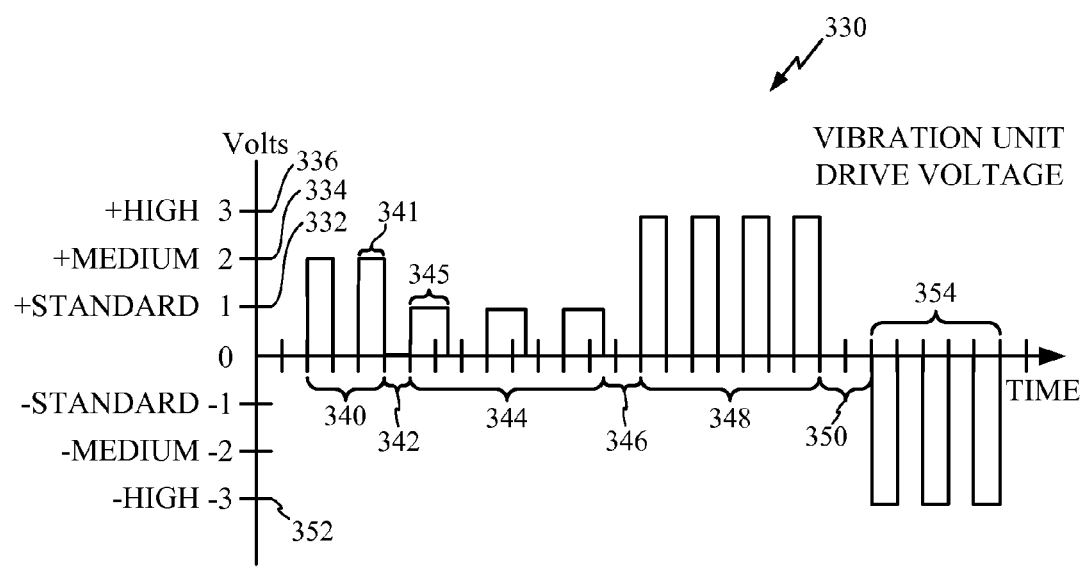
FIG. 3B illustrates a graph of a second drive voltage pattern for a vibration unit.

FIG. 3B illustrates a graph of a second drive voltage pattern 330 for a vibration unit in accordance with an embodiment of the invention. In the second drive voltage pattern 330, the vibration level begins at a medium level drive voltage 334 with a first pulse duration 341 and repetition rate for a period 340 followed by a short quiet gap 342. A standard vibration level drive voltage 332 with a second pulse duration 345 and repetition rate is then applied for a period 344 followed by a quiet gap 346. Next, a high vibration level drive voltage 336 with the first pulse duration 341 and repetition rate is applied for a period 348 followed by a quiet gap 350. For those portable devices which support vibration characteristics for positive drive voltages which are different for negative voltages, a series of negative high vibration level drive voltage 352 pulses are applied for a period 354. As compared to the first drive voltage pattern 300, the second drive voltage pattern 330 may be utilized to convey a greater sense of urgency in alerting the user to the message the portable device has received. In any case, the two patterns will be readily distinguishable from each other by the user and are exemplary of a multitude of different patterns that may be applied to convey different information to the user.

Figure 4:
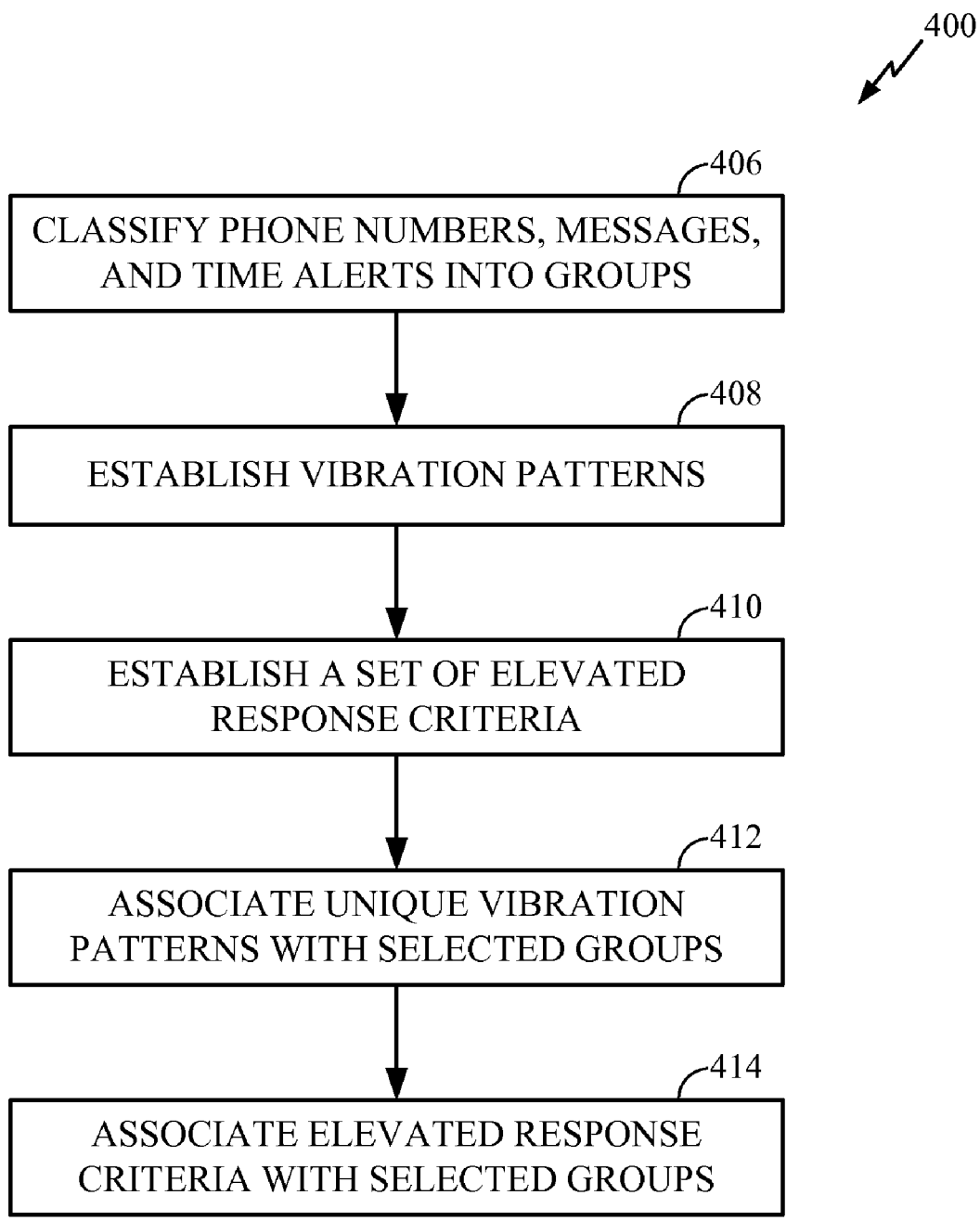
FIG. 4 illustrates a configuration process for configuring a vibration controller.

FIG. 4 illustrates a configuration process 400 for configuring a vibration controller in accordance with an embodiment of the invention. Upon entering the configuration process 400, selected phone numbers, messages, and time based alerts are classified into groups identified with group identification (ID) numbers in block 406 as specified by a user. A list of vibration patterns is set up in block 408, which may include a default list of vibration patterns, a user customized set of vibration patterns, or the like. Also, a set of elevated response criteria are set up in block 410. Examples of elevated response criteria include, frequency of calls from a selected group or a selected phone number, time period from last call as a threshold, receipt of a priority notification, dependency on whether a previous call was answered or not answered, and the like. In block 412, unique vibration patterns are associated with selected groups. In block 414, elevated response criteria are associated with selected groups.

Figure 5:
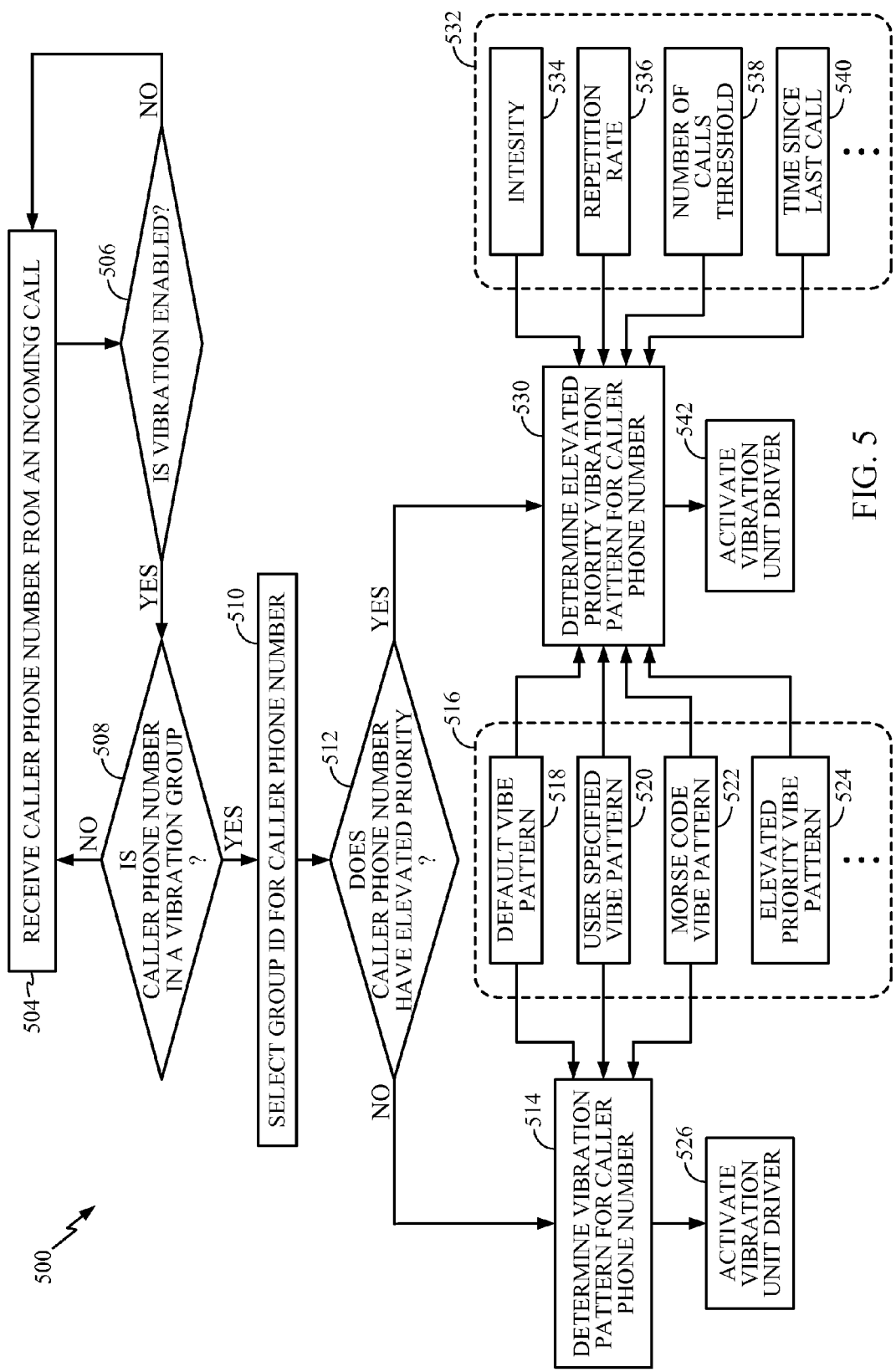
FIG. 5 illustrates a process for intelligent vibration (IV) operation for receiving incoming calls.

FIG. 5 illustrates a process 500 for intelligent vibration (IV) operation in accordance with an embodiment of the invention. The process 500 begins with receiving a calling phone number from an incoming call in block 504. In decision block 506, it is determined whether the vibration function is enabled. If the vibration function is not enabled, the process 500 returns to block 504 to await receiving a calling phone number from the next incoming call. Call processing continues for this call without using a vibration alert. If the vibration function is enabled, processing continues with block 508 and it is determined whether the calling phone number is in a vibration group. If the calling phone number is not associated with a vibration group, then the process 500 returns to block 504 to await receiving a calling phone number from the next incoming call. If the calling phone number is associated with a vibration group, the group ID for the calling phone number is selected in block 510. Processing continues to decision block 512, where the calling phone number is checked to determine whether it has elevated priority. If the calling phone number does not have elevated priority, the process 500 proceeds to block 514, where a vibration pattern for the calling phone number is determined. Block 514 has access to a vibration (vibe) pattern list 516 which contains a plurality of files, such as, for example, a default vibe pattern file 518, a user specified vibe pattern file 520, a Morse code vibe pattern file 522, and other vibration pattern files, such as, an elevated priority vibe pattern file 524. The group ID associated with the calling phone number allows access to the appropriate vibration pattern from the vibration pattern list 516. The process 500 then proceeds to block 526 which calls the vibration unit driver and initiates the selected vibration pattern.

In decision block 512, if it is determined that the calling phone number has elevated priority, the process 500 proceeds to block 530 which determines the elevated priority vibration pattern for the calling phone number. Block 530 has access to an elevated response modifier list 532 which contains a plurality of files, such as, for example, an intensity file 534, a repetition rate file 536, a call threshold file 538, a last call threshold file 540, and the like. The intensity file 534 contains a listing of intensity functions for varying the intensity of vibration, the repetition rate file 536 contains a listing of various repetition rates, the call threshold file 538 contains a listing of number of calls thresholds classified with the calling number groups, and the last call threshold file 540 contains a listing of time periods since last call. The elevated response criteria associated with the calling phone number is determined and the appropriate vibration pattern is selected from the vibration pattern list 516. At this point, the appropriate elevated response modifier from the elevated response modifier list 532 is also selected. Based on the selected vibration pattern and selected elevated response modifier, a vibration pattern is determined in block 530. The process 500 then proceeds to block 542 in which the vibration unit driver is activated to initiate the selected vibration pattern.

Figure 6:
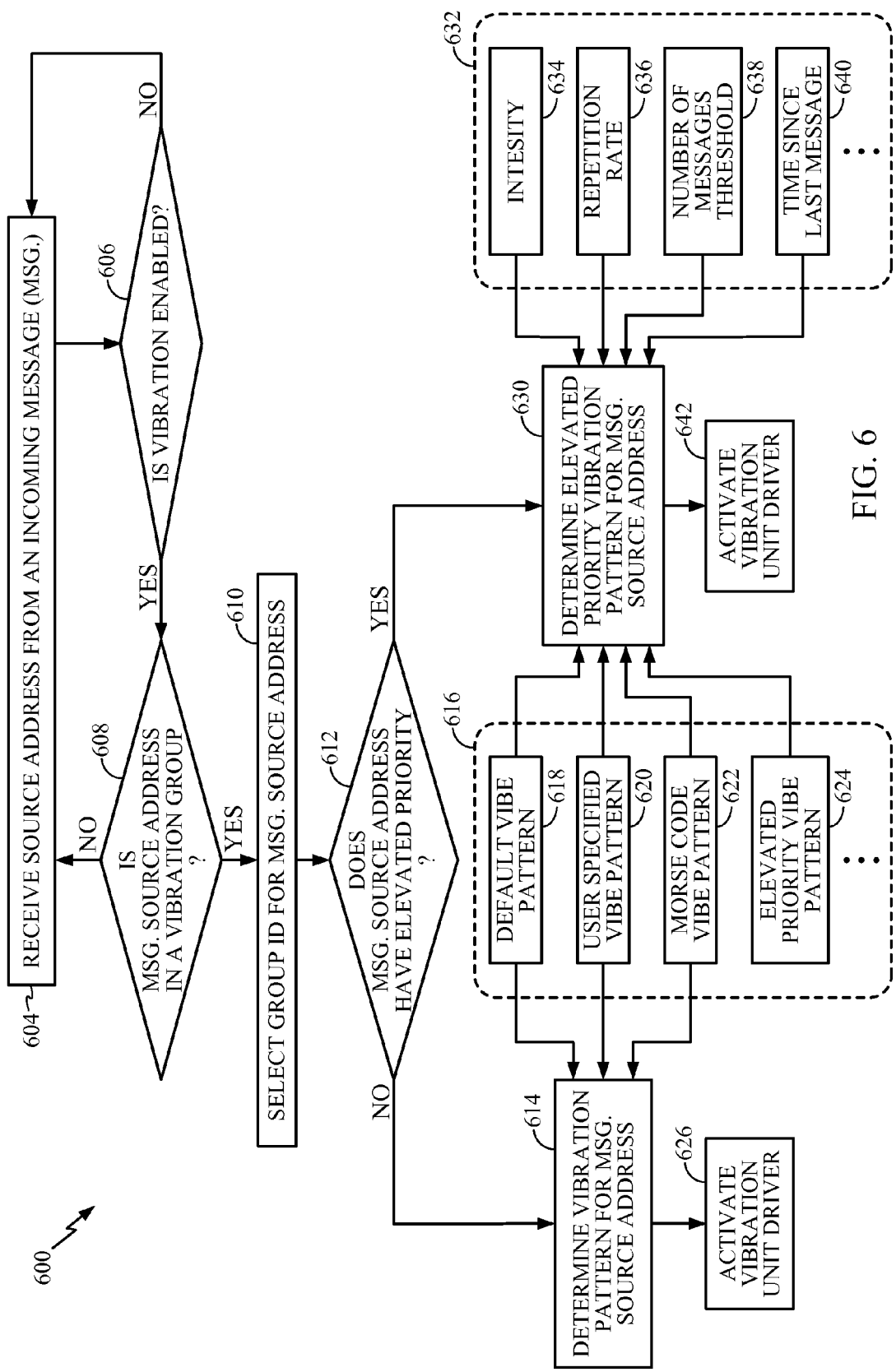
FIG. 6 illustrates a process for intelligent vibration (IV) operation for receiving incoming messages.

In a similar manner to receiving calls on a portable device, text messages may also be received, and classified by source address into groups. Each group of source addresses may then be associated with a unique vibration pattern and may also be associated with an elevated response criteria. FIG. 6 illustrates a process 600 for intelligent vibration (IV) operation for receiving incoming messages in accordance with an embodiment of the invention. The process 600 follows the format of process 500 using similar processing steps for operating on messages.

As an example, a user obtains a portable device having a tactile vibration controller feature such as illustrated in FIG. 2. The user configures the portable device to use the tactile alert feature by setting up multiple groups for business associates, a group for immediate family members, a group for friends, a group for emergency events, an unknown group, and an appointment group. The unknown group is set up as being those phone numbers and text message source addresses which are not in any of the groups. The emergency group is configured as an elevated response to a criteria of having two calls within a five minute period from the same phone number for any of the groups and for text messages having an urgency indication. The user selects from a default list of vibration patterns for alerts from the business groups and the friend group. The user also specifies a unique set of vibration patterns for the immediate family group, a special emergency vibration pattern for the emergency group, and no vibration for the unknown group. The user then enables the tactile alert feature, which disengages audible ringtones, on the way to see a movie. While at the movie theater, a number of phone calls and text messages arrive on the user's portable device that are not in any group and, even though the portable device is enabled for the tactile alert feature, classifies these phone calls and text messages as members of the unknown group and no vibration alert occurs. Also, at the movie theater, a phone call comes in from an immediate family member, which causes a discrete tactile alert. The user not wishing to miss a part of the movie disregards the tactile alert. Within five minutes, a second phone call comes in from the same immediate family member phone number which the portable device evaluates as requiring an elevated response belonging to the emergency group. The portable device then causes the special emergency vibration pattern to vibrate the portable device. The user recognizes the special emergency vibration and excuses himself from the movie theater to answer the phone call.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration.

The methods described in connection with the embodiments disclosed herein may be embodied directly in hardware, in a software module executed by a processor, or in a combination of the two. A software module or program code may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

While the present invention has been disclosed in a presently preferred context, it will be recognized that the present teachings may be adapted to a variety of contexts consistent with this disclosure and the claims that follow. For example, the present invention is disclosed mainly in the context of incoming calls or text messages. It will be appreciated that it may also be employed with video systems for forwarding priority video clips to a portable device and discretely notify a user of the received video clip. It will also be appreciated that variations in the particular hardware and manufacturing steps employed are feasible, and are expected as both evolve with time. For example, it is possible that variations in processors and programs generally described herein can be expected as technology processes change and new technology processes are developed. Other such modifications and adaptations to suit a particular design application will be apparent to those of ordinary skill in the art.

What is claimed is:

1. A method for conveying a tactile alert on a portable device, the method comprising:
    determining a group identification (ID) for a communication received from a classified source address;
    associating the group ID with a unique vibration pattern;
    determining whether the classified source address is an elevated response source address, and if so, associating the elevated response source address with an elevated response vibration pattern as the unique vibration pattern;
    determining whether the time period between communications received from the same source address is sufficiently small to generate a time urgency indication, and if so, determining the unique vibration pattern based on the time urgency indication;
    determining whether the number of communications from the same source address is sufficiently large to generate a repetition urgency indication, and if so, determining the unique vibration pattern based on the repetition urgency indication; and
    vibrating the portable device according to the unique vibration pattern.

2. The method of claim 1, wherein the portable device is a cell phone and the communication is a phone call.

3. The method of claim 1, wherein the portable device is a cell phone and the communication is a text message.

4. The method of claim 1, wherein the portable device is a cell phone and the communication is a time alert for an upcoming event.

5. The method of claim 1 wherein the portable device is a pager.

6. The method of claim 1 wherein the unique vibration pattern is a user specified vibration pattern.

7. The method of claim 1 wherein the unique vibration pattern is a Morse code vibration pattern.

8. The method of claim 1 wherein the unique vibration pattern is a no vibration pattern.

9. The method of claim 1, wherein the classified source addresses comprises stored phone numbers, the method further comprising:
classifying selected phone numbers into groups;
establishing a plurality of vibration patterns; and
associating a vibration pattern with one of the groups of selected phone numbers.

10. An apparatus for conveying a tactile alert on a portable device, the apparatus comprising:
a receiver configured to receive an incoming communication from a source address;
a processor complex having a processor and program memory configured to execute alert processing tasks;
an alert processing component configured to have one or more alert processing tasks for classifying the incoming communication from the source address and to determine a unique vibration pattern for the classified incoming communication based on whether:
the classified incoming communication is associated with one of a plurality of contact groups;
the source address of the classified incoming communication is associated with an elevated response source address, and if so, associating the incoming communication with an elevated response vibration pattern as the unique vibration pattern;
a time period between communications received from the same source address is sufficiently small to generate a time urgency indication, and if so, determining the unique vibration pattern based on the time urgency indication; and
determining whether the number of communications from the same source address is sufficiently large to generate a repetition urgency indication, and if so, determining the unique vibration pattern based on the repetition urgency indication; and
a vibration unit configured to vibrate the portable device according to the unique vibration pattern to convey the tactile alert.

11. The apparatus of claim 10 wherein the incoming communication is a phone call and the alert processing component comprises:
a signal protocol processing task configured to determine a calling phone number for the received incoming communication;
a determine contact group task configured to determine if the calling phone number is associated with a contact group; and
a determine vibration pattern task configured to select a vibration pattern based on a determined contact group.

12. The apparatus of claim 10 wherein the incoming communication is a text message and the alert processing component comprises:
a text message processing task configured to determine a message source address for the received incoming communication;
a determine contact group task configured to determine if the message source address is associated with a contact group; and
a determine vibration pattern task configured to select a vibration pattern based on a determined contact group.

13. A computer readable medium including program code stored thereon, comprising:
program code for determining a group identification (ID) for a communication received from a classified source address or time alert;
program code for associating the group ID with a unique vibration pattern;
program code for determining whether the classified source address is an elevated response source address, and if so, associating the elevated response source address with an elevated response vibration pattern as the unique vibration pattern;
program code for determining whether the time period between communications received from the same source address is sufficiently small to generate a time urgency indication, and if so, determining the unique vibration pattern based on the time urgency indication;
program code for determining whether the number of communications from the same source address is sufficiently large to generate a repetition urgency indication, and if so, determining the unique vibration pattern based on the repetition urgency indication; and
program code for vibrating the portable device according to the unique vibration pattern to convey the tactile alert.

14. The computer readable medium of claim 13 further comprising:
program code for generating a modified vibration pattern based on a vibration pattern selected from a file containing a set of unique vibration patterns and an elevated response modifier criteria selected from a file containing a set of elevated response modifier criteria; and
program code for providing the modified vibration pattern to a vibration unit driver to vibrate the portable device according to the modified vibration pattern.

15. The method of claim 1, wherein the group ID is established at the portable device by a user of the portable device.

16. A portable device, comprising:
means for determining a group identification (ID) for a communication received from a classified source address or time alert;
means for associating the group ID with a unique vibration pattern;
means for determining whether the classified source address is an elevated response source address, and if so, associating the elevated response source address with an elevated response vibration pattern as the unique vibration pattern;
means for determining whether the time period between communications received from the same source address is sufficiently small to generate a time urgency indication, and if so, determining the unique vibration pattern based on the time urgency indication;
means for determining whether the number of communications from the same source address is sufficiently large to generate a repetition urgency indication, and if so, determining the unique vibration pattern based on the repetition urgency indication; and
means for vibrating the portable device according to the unique vibration pattern to convey the tactile alert.

17. The method of claim 1, wherein the group ID identifies a group having a local set of conditions by which incoming communications at the portable device are classified.

18. The method of claim 17, wherein the determining step determines the group ID for the communication based in part on whether the classified source address satisfies one or more of the local set of conditions for the group.

19. The method of claim 17, wherein the local set of conditions includes one or more of (i) whether the classified source address is included in an address list for the local group, and (ii) whether a time at which the communication is received satisfies a given relationship with a time range.

20. The method of claim 1, wherein the communication is a one-to-one communication from a sender of the communication to the portable device.

* * * * *